(No Model.)
J. H. WITT.
PLANT SHIELD FOR PLOWS.
No. 348,941. Patented Sept. 7, 1886.
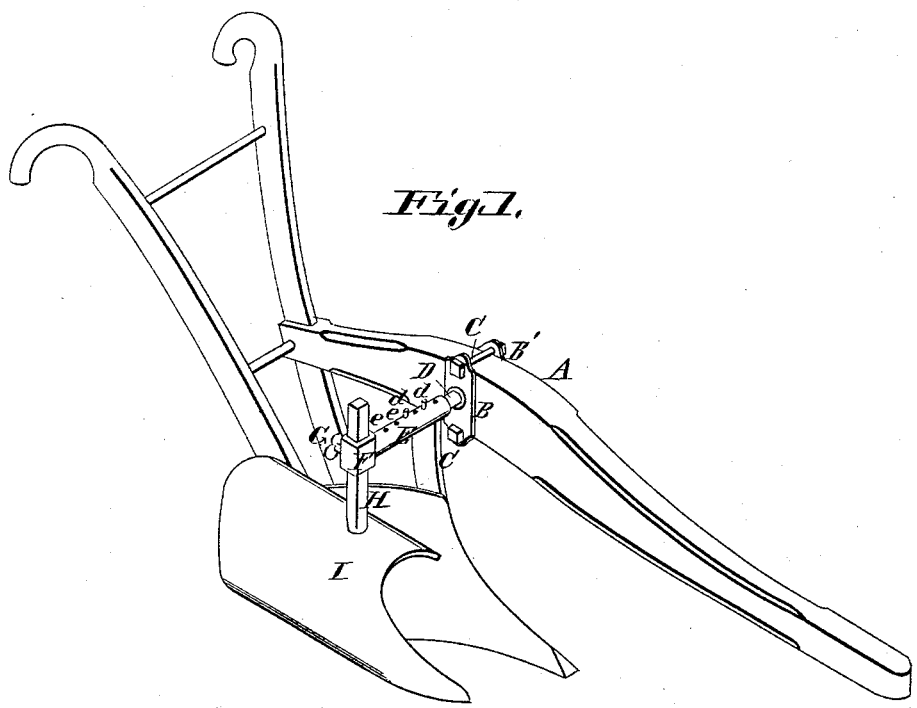
Fig. 1.
Fig. 2.
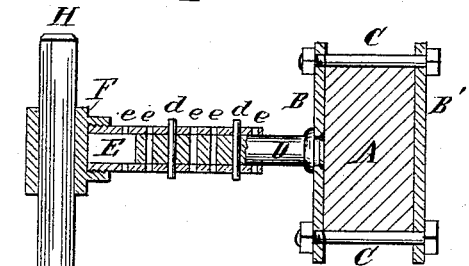
Attest:
Charles Pickles
F. A. Hopkins
Inventor:
Joseph H. Witt.
By Knight Bros
Attys.

UNITED STATES PATENT OFFICE.

JOSEPH H. WITT, OF BOBRING, MISSOURI.

PLANT-SHIELD FOR PLOWS.

SPECIFICATION forming part of Letters Patent No. 348,941, dated September 7, 1886.

Application filed January 27, 1886. Serial No. 189,947. (No model.)

*To all whom it may concern:*

Be it known that I, JOSEPH H. WITT, of Bobring, St. Louis county, in the State of Missouri, have invented a certain new and useful Improvement in Plant-Shields for Plows, of which the following is a full, clear, and exact description, reference being had to the accompanying drawings, forming part of this specification.

This invention is in the line of improvements on cultivating-plows belonging to the same class as that of the Patent No. 310,109, issued to me December 30, 1884; and it consists in telescoping the arm by which the shield is connected to the plow-beam, for the purpose of relieving it from any uncommon heavy strain and giving means for the transverse adjustment of the shield.

Figure 1 is a perspective view of the invention. Fig. 2 is an enlarged vertical section.

A is the plow-beam.

B B' are bracket-plates, secured against the sides of the beam by screw-bolts C, above and below the beam.

D is a round bar rigidly attached to the plate B and extending rectangularly therefrom.

E is a tubular sleeve, telescoped on the bar D, fitting neatly thereon, but with sufficient freedom to allow it to turn or be moved endwise thereon. The sleeve may properly be made of gas-pipe. Secured to the end of the sleeve is the square eye or socket-head F, through which the shank H of the shield A passes, and in which it is held by a set-screw, G. The sleeve E and bar D are bored with a number of matching holes at e, preferably at equal distances asunder. The holes are intended for the reception of wooden pin or pins d, which hold the sleeve E rigidly to the bar D under any usual strain, but give way under any strain severe enough to bend the bar or sleeve or to break any part of the device except the pins.

It will be understood that it is almost a matter of necessity that the shield attachment should be light, and it is thus liable to be damaged by coming in contact with a rock or root, where there is no means of relief such as is proposed. It will also be understood that it should have means for transverse adjustment on the plow, and the device gives very ready means for adjustment.

The improvement is applicable to almost any of the plant-shields on plows and cultivators.

I claim as my invention—

1. The combination of a plow and plant-shield, the connecting parts D E telescoped together and bored through to receive wooden pin d, substantially as and for the purpose set forth.

2. The combination of a plow-beam, the telescoped arm D E, with holes e, and break-pin d, a socket, F, and an adjustable shield-shank passing through the socket, as shown and described.

JOSEPH H. WITT.

Witnesses:
SAML. KNIGHT,
JOSEPH WAHLE.